(12) United States Patent
Sébire et al.

(10) Patent No.: US 8,594,060 B2
(45) Date of Patent: Nov. 26, 2013

(54) GROUPING OF CELLS FOR EFFICIENT NEIGHBOR CELL INFORMATION DISTRIBUTION

(75) Inventors: Guillaume Sébire, Espoo (FI); David Philip Hole, Southampton (GB)

(73) Assignee: Nokia Corporation, Espoo (FI)

( * ) Notice: Subject to any disclaimer, the term of this patent is extended or adjusted under 35 U.S.C. 154(b) by 627 days.

(21) Appl. No.: 12/428,259

(22) Filed: Apr. 22, 2009

(65) Prior Publication Data

US 2010/0074235 A1 Mar. 25, 2010

Related U.S. Application Data

(60) Provisional application No. 61/125,156, filed on Apr. 22, 2008.

(51) Int. Cl.
*H04W 4/00* (2009.01)
*H04J 3/24* (2006.01)

(52) U.S. Cl.
USPC .......................... 370/338; 370/341; 370/349

(58) Field of Classification Search
USPC ........................................................ 370/338
See application file for complete search history.

(56) References Cited

U.S. PATENT DOCUMENTS

| | | | | |
|---|---|---|---|---|
| 5,423,063 | A * | 6/1995 | Goldberg | 455/503 |
| 2003/0174898 | A1 * | 9/2003 | Zheltov et al. | 382/246 |
| 2007/0167180 | A1 | 7/2007 | Ramesh | |
| 2007/0201651 | A1 * | 8/2007 | Bontempi | 379/142.02 |
| 2009/0082020 | A1 * | 3/2009 | Ch'ng et al. | 455/435.3 |
| 2009/0122839 | A1 * | 5/2009 | Luo et al. | 375/145 |
| 2009/0168727 | A1 | 7/2009 | Somasundaram | |
| 2009/0176490 | A1 | 7/2009 | Kazmi | |

FOREIGN PATENT DOCUMENTS

| | | |
|---|---|---|
| CN | 1297661 A | 5/2001 |
| EP | 1079645 | 2/2001 |
| EP | 1530311 | 5/2005 |
| WO | 9901005 | 1/1999 |
| WO | 2008034408 | 3/2008 |

OTHER PUBLICATIONS

International Search Report and Written Opinion Received in the Corresponding PCT Application No. PCT/IB2009/005335 sent on Aug. 12, 2009, p. 1-16.

(Continued)

*Primary Examiner* — Derrick Ferris
*Assistant Examiner* — Kodzovi Acolatse
(74) *Attorney, Agent, or Firm* — Harrington & Smith

(57) ABSTRACT

In accordance with the exemplary embodiments of the invention there is described a method and apparatus to group at least one cell of a network according to at least one characteristic of a physical layer cell identification of the at least one cell, and to signal a representation comprising the at least one characteristic of the grouped at least one cell to a mobile station. In addition, according to another exemplary aspect of the invention there is at least a method and apparatus to receive signaling comprising a representation of a grouped at least one cell of a network, where the representation is according to at least one characteristic of a physical layer cell identification of the at least one cell, and to determine, based on the signaling, whether the grouped at least one cell are to be considered for an operation including at least one of reselection and measurement reporting.

20 Claims, 5 Drawing Sheets

(56) References Cited

OTHER PUBLICATIONS

3rd Generation Partnership Project (3GPP), 3GPP TS 44.018, Technical Specification Group GSM/EDGE Radio Access Network; Mobile Radio Interface Layer 3 Specification; Radio Resource Control (RRC) Protocol, 2006, V7.7.0, p. 9.1.30(a).

3rd Generation Partnership Project (3GPP), 3GPP TS 45.010, Technical Specification Group GSM/EDGE, Radio Access Network, Radio Subsystem Synchronization, 2003, V6.0.0, p. 3.3.2.2.1.

"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.3.0, Dec. 2007, 121 pgs.

"31$^{rd}$ Generation Partnership Project; Technical Specification Group GSM/EDGE Radio Access Network; Multiplexing and multiple access on the radio path (Release 7)", 3GPP TS 45.002 V7.6.0, Nov. 2007, 105 pgs.

"3$^{rd}$ Generation Partnership Project; Technical Specification Group GSM/EDGE Radio Access Network; Mobile radio interface layer 3 specification; Radio Resource Control (RRC) protocol (Release 8)", 3GPP TS 44.018 V8.2.0, Mar. 2008, 399 pgs.

\* cited by examiner

630 A first field comprising a pattern length in bits

Example:   PCID_Pattern_length (3 bit field)

640 A second field comprising a pattern of bits of a length defined based on said first field Example:   PCID_Pattern

650 A third field comprising a sense bit to indicate whether the group of at least one cell includes each cell identified by a physical layer cell identification of which the most significant bit or bits equal said pattern of bits, or each cell identified by a physical layer cell identification of which the most significant bit or bits do not equal said pattern of bits Example:

PCID_pattern_sense (1 bit field)

FIGURE 6

GROUPING OF CELLS FOR EFFICIENT NEIGHBOR CELL INFORMATION DISTRIBUTION

CROSS-REFERENCE TO RELATED APPLICATIONS

This patent application claims priority under 35 U.S.C. §119(e) from Provisional Patent Application No. 61/125,156 filed Apr. 22, 2008, the disclosure of which is incorporated by reference herein in its entirety.

TECHNICAL FIELD

The exemplary and non-limiting embodiments of this invention relate generally to wireless communication systems, methods, devices and computer programs and, more specifically, relate to techniques for grouping cells based at least on their physical layer cell identification and signaling the groups to mobile stations and other user equipment.

BACKGROUND

3GPP third generation partnership project
ACK acknowledge
ACCH associated control channel
ARFCN absolute radio frequency channel number
BCCH broadcast control channel
BW bandwidth
CDM code division multiplexing
CQI channel quality indicator
C-RNTI cell radio network temporary identifier
DL downlink (eNB towards UE)
eNB EUTRAN Node B (evolved Node B)
EPC evolved packet core
EUTRAN evolved UTRAN (LTE)
FDD frequency division duplex
FDMA frequency division multiple access
FDPS frequency domain packet scheduler
HARQ hybrid automatic repeat request
HO handover
LTE long term evolution
MAC medium access control
MME mobility management entity
MM mobility management
NACK not acknowledge
Node B base station
O&M operations and maintenance
OFDMA orthogonal frequency division multiple access
PCI physical layer cell identification
PCID physical layer cell identification
PDCP packet data convergence protocol
PDU protocol data unit
PHY physical
PRB physical resource block
RB radio bearer
RLC radio link control
RRC radio resource control
RRM radio resource management
SC-FDMA single carrier, frequency division multiple access
SCH synchronization channel
SDU service data unit
S-GW serving gateway
SN sequence number
TDD time division duplex
TTI transmission time interval
UE user equipment
UL uplink (UE towards eNB)
UMTS universal mobile telecommunication system
UTRAN universal terrestrial radio access network This section is intended to provide a background or context to the exemplary embodiments of the invention that are recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Communication networks typically operate in accordance with a given standard or specification which sets out what the various elements of the network are permitted to do and how that should be achieved. For example, the standard may define whether the user or more precisely, user equipment is provided with a circuit switched service or a packet switched service. The standard may also define the communication protocols which shall be used for the connection. The given standard also defines one or more of the required connection parameters. The connection parameters may relate to allowable connections or to various features of the connection. Further, the standard may also define which cells a mobile station should select or avoid.

In other words, the standard defines the "rules" and parameters on which the communication within the communication system can be based. Examples of the different standards and/or specifications include, without limiting to these, specifications such as GSM (Global System for Mobile communications) or various GSM based systems (such as GPRS: General Packet Radio Service), AMPS (American Mobile Phone System), DAMPS (Digital AMPS), WCDMA (Wideband Code Division Multiple Access) or CDMA in UMTS (Code Division Multiple Access in Universal Mobile Telecommunications System) and so on.

A communication system known as evolved UTRAN (E-UTRAN, also referred to as UTRAN-LTE or as E-UTRA) has been under development within the 3GPP. The DL access technique is OFDMA, and the UL access technique will be SC-FDMA.

The exemplary embodiments of the invention may relate to the more recent 3GPP 'Long Term Evolution' (LTE). In LTE, the bandwidth of signals is high (typically >5 MHz), which means that there will be very dense frequency use, and base stations will likely use a carrier frequency that is also being used by a close neighbor.

One specification of interest is 3GPP TS 36.300, V8.3.0 (2007-12), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8).

FIG. 1 reproduces FIG. 4 of 3GPP TS 36.300, and shows the overall architecture of the E-UTRAN system. The E-UTRAN system includes eNBs, providing the E-UTRA user plane (PDCP/RLC/MAC/PHY) and control plane (RRC) protocol terminations towards the UE. The eNBs are interconnected with each other by means of an X2 interface. The eNBs are also connected by means of an S1 interface to an EPC, more specifically to a MME (Mobility Management Entity) by means of a S1-MME interface and to a Serving Gateway (S-GW) by means of a S1-U interface. The S1 interface supports a many-to-many relation between MMEs/Serving Gateways and eNBs.

The eNB hosts the following functions:
functions for Radio Resource Management: Radio Bearer Control, Radio Admission Control, Connection Mobility Control, Dynamic allocation of resources to UEs in both uplink and downlink (scheduling);

IP header compression and encryption of user data stream;
selection of a MME at UE attachment;
routing of User Plane data towards Serving Gateway;
scheduling and transmission of paging messages (originated from the MME);
scheduling and transmission of broadcast information (originated from the MME or O&M); and measurement and measurement reporting configuration for mobility and scheduling.

The exemplary embodiments of the invention at least address issues resulting from the use of dense frequencies by, but not limited to, an LTE-type network.

SUMMARY

In an exemplary aspect of the invention there is a method comprising grouping at least one cell of a network according to at least one characteristic of a physical layer cell identification of the at least one cell, and signaling a representation comprising the at least one characteristic of the grouped at least one cell to a mobile station.

In an exemplary aspect of the invention, there is an apparatus, comprising a processor and an interface to a mobile station configured to group at least one cell of a network according to at least one characteristic of a physical layer cell identification of the at least one cell, and the processor and the interface configured to signal a representation comprising the at least one characteristic of the grouped at least one cell to the mobile station.

In an exemplary aspect of the invention there is an apparatus comprising means for grouping at least one cell of a network according to at least one characteristic of a physical layer cell identification of the at least one cell, and means for signaling a representation comprising the at least one characteristic of the grouped at least one cell to a mobile station.

In another exemplary aspect of the invention there is a method comprising receiving, at a mobile station, signaling comprising a representation of a grouped at least one cell of a network, where the representation is according to at least one characteristic of a physical layer cell identification of the at least one cell, and determining, based on the signaling, whether the grouped at least one cell are to be considered for an operation comprising at least one of reselection and measurement reporting.

In yet another exemplary aspect of the invention there is an apparatus comprising an interface configured to receive signaling comprising a representation of a grouped at least one cell of a network, where the representation is according to at least one characteristic of a physical layer cell identification of the at least one cell, and a processor configured to determine, based on the signaling, whether the grouped at least one cell are to be considered for an operation comprising at least one of reselection and measurement reporting.

In still another exemplary aspect of the invention there is an apparatus comprising means for receiving signaling comprising a representation of a grouped at least one cell of a network, where the representation is according to at least one characteristic of a physical layer cell identification of the at least one cell, and means for determining, based on the signaling, whether the grouped at least one cell are to be considered for an operation comprising at least one of reselection and measurement reporting.

A BRIEF DESCRIPTION OF THE DRAWINGS

The foregoing and other aspects of the embodiments of this invention are made more evident in the following Detailed Description, when read in conjunction with the attached Drawing Figures, wherein:

FIG. 1 reproduces FIG. 4 of 3GPP TS 36.300, and shows the overall architecture of the E-UTRAN system;

FIG. 6 illustrates a logic flow diagram which illustrates characteristics and examples of the signaling in accordance with the exemplary embodiments of this invention.

DETAILED DESCRIPTION

Figure 1:
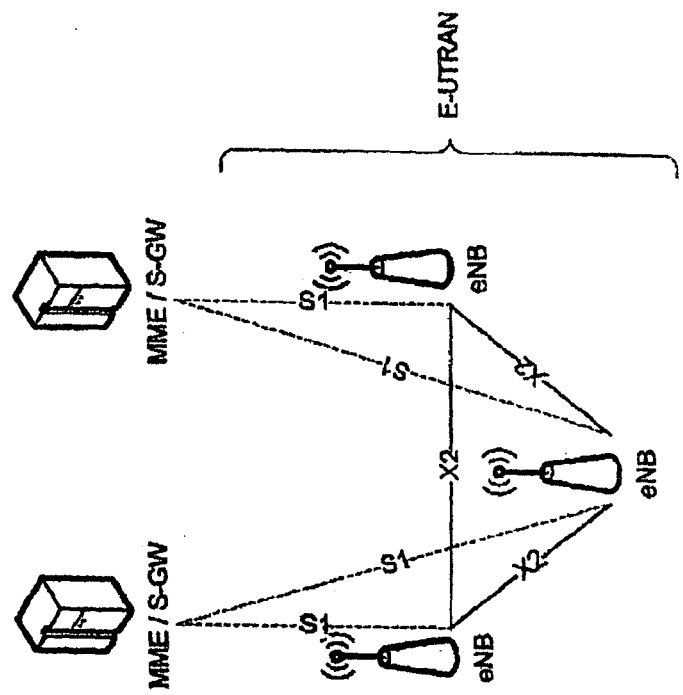

The exemplary embodiments of this invention will now be further described by way of example only, with reference to the following specific embodiments.

The inventors note that when considering factors such as dense frequency use, as stated above, a problem can arise concerning country/regional border areas where users of cells on each side of the border must select only cells in their own network. A probable scenario is that two operators (operator A and operator B) have cells using the same frequency on either side of the border. In order to select the correct cell it has been proposed that operator A and B have knowledge of which cells are in their network and which cells to avoid as the cells are not in their network.

As an example, consider the list of cells to be sent to users of operator A's network. In this case, a list of cells to avoid should be a list of all cells in the region belonging to operator B.

However, this would require:
a) operator A knowing exactly the list of operator B's cells
b) operator A to update its neighbor cell list every time operator B adds/removes a cell
c) operator A to ensure that none of its cells have common parameters as those of operator B (to ensure it doesn't 'blacklist' its own cells)

Note that an assumption is that there would be no means of distinguishing between operator A and operator B's cells, but any incorrect reselection (i.e. to operator B) would result in a 'lock-out' period (typically several minutes) where a mobile would not try to reselect to any other cell using the same frequency. This could result in a severe service disruption.

Thus, it can be seen that the above problem is an example of where some particular cells would be considered 'accessible' while others may not.

As submitted to the 3GPP Standards body, mechanisms for grouping a cell or identifying the operator to which it belongs require decoding of system information broadcast data. However, this decoding can require significant time, effort, and battery consumption to decode and evaluate (e.g., the tracking area code). In addition, in a connected mode, decoding may require interruption of the ongoing service. For at least voice calls such interruptions would be unacceptable.

The exemplary embodiments of this invention provide a mechanism for grouping cells in LTE based on their PCI, and signaling these groups of LTE cells to mobile stations. In general, the embodiments of the invention place no restriction on the manner in which these groups are defined, except that a group is classified according to one or more characteristics of its PCI values. According to non-limiting exemplary embodiments of the invention the characteristics could refer to values and/or the format of the PCI. Different options for the signaling are proposed depending on the flexibility required in defining the groups. According to exemplary embodiments of the invention there is a fixed-length approach (with a fixed number of bits or groups), and more flexible variable-length approaches (allowing arbitrary segmentation of PCI number space). In addition, in accordance with the embodiments of the invention a 'blacklist/whitelist sense' bit is proposed, to allow an indication that a group belongs either to the 'acceptable' (e.g., friendly) operator or to a 'non-acceptable' (e.g., competitor) operator. Further, it is noted that the terms PCI and PCID may be used interchangeably and that the use of either term PCI or PCID is in no way limiting to the exemplary embodiments of the invention.

Before describing in further detail the exemplary embodiments of the invention, reference can be made to 3GPP TS 45.002, V7.6.0 (2007-11), 3rd Generation Partnership Project; Technical Specification Group GSM/EDGE; Radio Access Network; Multiplexing and multiple access on the radio path (Release 7) (incorporated by reference herein in its entirety), such as generally in section 3.3.2.2.1 for a description of the synchronization channel (SCH).

Reference can also be made to 3GPP TS 44.018, V8.2.0 (2008-03), 3rd Generation Partnership Project; Technical Specification Group GSM/EDGE; Radio Access Network; Mobile radio interface layer 3 specification; Radio Resource Control (RRC) protocol (Release 8) (incorporated by reference herein in its entirety), such as generally in section 9.1.30a for a description of the synchronization channel information.

Note that in this description reference is made to the case where there are two operators. However, the partitioning of PCI space may be useful for more than two operators, or even for a single operator, for example where different categories of user are permitted different access to cells. Therefore, references to groups which indicate the operator being used should be considered as examples of applications where an indication of grouping is required.

Figure 2:
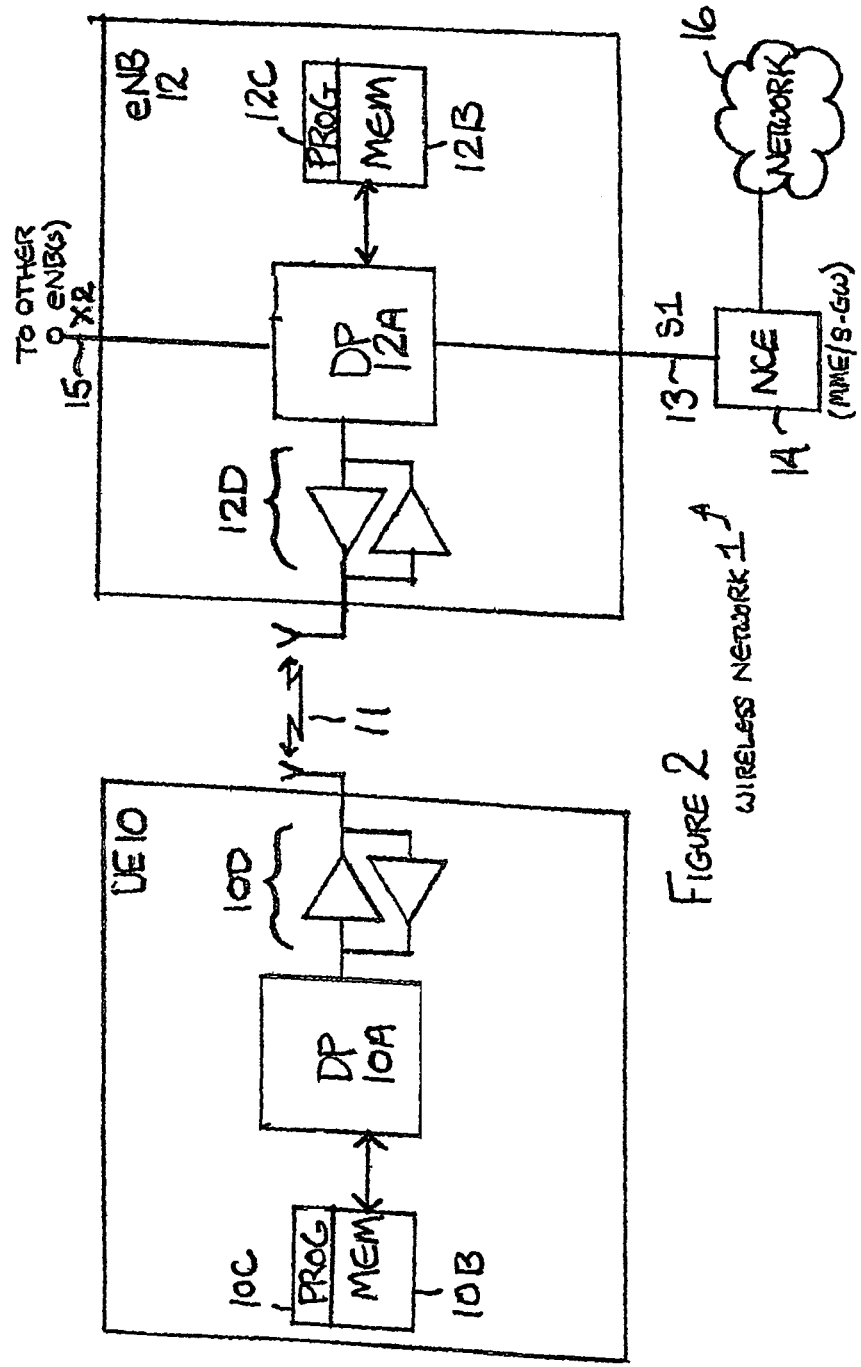
FIG. 2 shows a simplified block diagram of various electronic devices that are suitable for use in practicing the exemplary embodiments of this invention.

Reference is made to FIG. 2 for illustrating a simplified block diagram of various electronic devices that are suitable for use in practicing the exemplary embodiments of this invention. In FIG. 2 a wireless network 1 is adapted for communication with an apparatus, such as a mobile communication device which may be referred to as a UE 10, via a network access node, such as a Node B (base station), and more specifically an eNB 12. The network 1 may include a network control element (NCE) 14 that may include the MME/S-GW functionality shown in FIG. 1, and which provides connectivity with a network 16, such as a telephone network and/or a data communications network (e.g., the internet). The UE 10 includes a data processor (DP) 10A, a memory (MEM) 10B that stores a program (PROG) 10C, and a suitable radio frequency (RF) transceiver 10D for bidirectional wireless communications 11 with the eNB 12 via one or more antennas. The eNB 12 also includes a DP 12A, a MEM 12B that stores a PROG 12C, and a suitable RF transceiver 12D. The eNB 12 is coupled via a data path 13 to the NCE 14. The data path 13 may be implemented as the S1 interface shown in FIG. 1. At least one of the PROGs 10C and 12C is assumed to include program instructions that, when executed by the associated DP, enable the electronic device to operate in accordance with the exemplary embodiments of this invention, as will be discussed below in greater detail.

That is, the exemplary embodiments of this invention may be implemented at least in part by computer software executable by the DP 10A of the UE 10 and by the DP 12A of the eNB 12, or by hardware, or by a combination of software and hardware.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multicore processor architecture, as non-limiting examples.

As proposed to the 3GPP standards body an identification of LTE cells at the physical layer can be by means of the carrier frequency and physical layer cell ID (PCI). The PCI is comparable to the primary scrambling code used in UMTS to identify cells on a specific carrier frequency. Further, as proposed the PCI is expected to be 9 bits long.

As was stated above, exemplary embodiments of the invention define a mechanism for grouping cells in LTE based on their PCI, and signaling these groups of LTE cells to mobile stations. As previously stated, in general, according to the exemplary embodiments of the invention there is no restriction placed on the manner in which these groups are defined, except that a group is classified according to one or more characteristics of its PCI values. According to non-limiting exemplary embodiments of the invention different options for the signaling are proposed depending on at least the flexibility required in defining the groups. Further, according to a non-limiting exemplary embodiment of the invention the PCI is 9 bits long. In addition, it is noted that any examples and assumptions which follow may be based upon the PCI being 9 bits long.

In accordance with the exemplary embodiments of the invention a fixed-length approach using a fixed number of groups, and a variable-length approach that is allowing arbitrary segmentation of a PCI number space are presented. Further, in accordance with a non-limiting embodiment of the invention a 'blacklist/whitelist sense' bit is also proposed at least to allow an indication that a group belongs either to the 'acceptable' operator or to a 'non-acceptable' operator.

A 'blacklist' approach may be used as a means of indicating to a mobile which cells it may perform reselection to (in idle mode) or should report measurements for (in connected mode). In a blacklist approach, the information would comprise the frequencies on which 'valid' neighbor cells are operating, together with the PCI of cells which are not to be considered for reselection or measurement reporting on those frequencies. By contrast, a whitelist approach would indicate which cells are to be considered for reselection or measurement reporting.

It is noted that in GSM a network color code is used. However, this is a separate parameter which forms part of the BSIC (base station identity code). This is not however, part of a physical layer parameter, but is broadcast on a specialized synchronization channel (SCH)—see 3GPP TS 45.002 subclause 3.3.2.2.1, 3GPP TS 44.018 subclause 9.1.30a. Further, it is noted that Figure 9.1.30a.1 of 3GPP TS 44.018 shows a Frame synchronization information element.

A non-limiting exemplary embodiment of the invention is a) the use of the physical parameter (e.g. scrambling code) itself as a means of grouping cells and b) the method of signaling the groupings (especially in the case where flexible grouping is used) and c) the approach of grouping cells according to their PCI in order to more efficiently communicate a list of cells, and d) the act of such grouping.

The black list may contain an explicit list of all PCIs which cannot be accessed—in practice this would mean that at a minimum it must contain all cells belonging to other operators. Therefore a non-limiting benefit of the use of the exemplary embodiments of this invention is a significant reduction in the amount of signaling required to signal the complete blacklist (noting that it does not matter if the grouping covers cells which do not exist, providing that they do not belong to the 'accessible' group). Bearing in mind the fact that each PCI requires 9 bits of signaling, and that there could be 10's or 100's of these, an explicit list could (particularly in GERAN systems) require a significant portion of the capacity of the signaling channels on which these lists would be sent.

A further disadvantage of the explicit list is that it must be updated every time a cell in the 'inaccessible' group is added. By means of the use of the exemplary embodiments of this invention, bordering operators need to cooperate only to the extent of agreeing which group(s) to use for their cells.

PCIs for cells are assigned so that cells belonging to a common group have similar PCI values, so that signalling a representation of the group e.g. by one of the methods below, or by some other appropriate method can be efficiently done. Methods of signalling the groups are also provided as described below.

Fixed Length Approach:
A certain set of bits in the PCI indicates a 'group', such as the two most significant bits.

Then, in the neighbour cell list, an indication of which cells belong to operator A's network is given. This indication may be provided using a bitmap. for example, a 2-bit group indication may encode four groups, and a 4-bit bitmap also indicates which of the four groups apply.

As a non-limiting embodiment of the invention only cells with most significant bits (MSB) equal to '11' belong to operator A (so all of operator A's cells would have PCI=11xxxxxxx), and the bitmap has the form: 0001

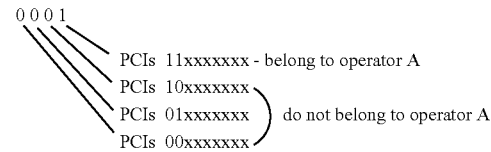

Variable Length Approach:
This approach may provide greater flexibility, and allows a finer granularity of grouping. The principle is that the grouping is identified by one or more repetitions of a 'pattern', of length n bits. Here, if the n most significant bits (MSBs) of a PCI equal the pattern, then that PCI falls within a group.

For example if the pattern is 5 bits long and is equal to "01000", then all PCIs of the format: 01000xxxx fall into this group.

An example of a coding approach for this (where the maximum pattern length is 4 bits) (as used in some 3GPP messages) could be as follows:

---
pattern_length : bit (2) -- note that this the length of the pattern minus1
pattern
: bit (val(pattern_length)+1)
---

Note that this is more efficient coding than the fixed length approach. For example where only two groups exist, distinguished only by the most significant bit, the pattern length uses 2 bits, and indicates that the pattern length is 1 bit, so the total length is 3 bits, rather than 4 bits in the fixed approach. Where 2-bit patterns are used, the length is the same in either case.

This approach allows more flexibility than the fixed length approach. Further, this approach could be useful where an operator has a small number of LTE cells which would need to be grouped, or where an operator has a large number of cells.

To allow multiple patterns within the group the structure can be repeated:

---
{ 0   pattern_length : bit (2) -- note that this the length of the pattern
      minus 1
      pattern : bit (val(pattern_length)+1)
} ** 1      -- repeat until you see a '1'
---

Example: Operator B agrees to use only PCIs with value '1110xxxxx'; then operator A would indicate its blacklist by use of the above coding, where pattern_length would indicate 3 (i.e. one less than the actual pattern length), and the pattern would indicate '1110'.

Blacklist/Whitelist 'Sense' Indication with Variable Length Approach:
The most efficient coding of these groups could vary depending on whether a blacklist or whitelist approach is taken. Therefore it is proposed that a 'blacklist/whitelist sense' bit is added to the definition of a pattern or group, to indicate whether that group/pattern describes cells which are part of a network to which operator A belongs (e.g., whose network the list is being sent) or another operator.

For example, if only a small number of cells exist in the 'other operator' network, then a blacklist approach would work best (i.e., the pattern would cover the small number of cells in the other network).

In general it is beneficial that the patterns require infrequent changes, and this means that it is better if the patterns are flexible enough (while still being efficient) to represent not only the existing deployment, but also a reasonable estimate of future deployments.

Example 1: operator B agrees to use only PCIs with value '1110xxxxx'; then operator A would indicate (in this example by use of the coding described above under "Variable length approach") pattern_length=3, pattern '1110', and the blacklist/whitelist sense indicating 'blacklist'.

Example 2: operator B wishes to use three quarters of the possible PCIs, specifically those with values '1xxxxxxxx' and '01xxxxxxx', and operator A uses the remainder (i.e. those with value '00'); then operator A would indicate (in this example by use of the coding described above under "Variable length approach"), pattern_length=1, pattern '00', and the blacklist/whitelist sense indicating 'whitelist'.

Modified Variable Length Approach with Blacklist/Whitelist 'Sense' Indication:

A further enhancement of the approach above, which is particularly beneficial when there are only two operators in any given area is to fix the pattern to be all 1's. Combined with a blacklist/whitelist 'sense' indication, this can indicate that any group of 2^n addresses belong to either operator A or some other operator.

For example, if operator A uses one quarter of the PCI space, those values with PCI='11xxxxxxx'; then the pattern length is 2. This may be coded as:

---
blacklist/whitelist sense: whitelist [these cells belong to operator A]
pattern length : 2
---

For example, if operator A agrees that the neighboring operators can use a block of addresses comprising one eighth of the address space, those with PCI='111xxxxxx'; operator A can then use all remaining addresses. This may be coded as:

---
blacklist/whitelist sense: blacklist [these cells do not belong to operator A]
pattern length : 3
---

This would require in all cases only 3 bits, providing a granularity of one sixteenth is sufficient. As an example, CSN.1 coding could be:

---
blacklist_whitelist_sense: bit(1)
pattern_length : bit (2)
---

(where pattern_length is the binary representation of the pattern length minus one).

This structure could be repeated to give more flexibility and this might be required in case of 3 or more overlapping operators. Structures are processed sequentially, so that in the nth step only PCIs which have been explicitly excluded or included after processing the (n−1)th step are considered.

As an example, operators A and B wish to use one quarter of the possible PCIs, and operator C wishes to use one half of the PCIs. Then operator A uses '10xxxxxxx', operator B uses '11xxxxxxx', and operator C uses '0xxxxxxxx'.

Operator A indicates two groups:
  group 1: pattern length=1, whitelist (i.e. excludes all operator C's cells)
  group 2: pattern length=2, blacklist (i.e. excludes all operator B's cells)
Operator B indicates one group:
  group 1: pattern length=2, whitelist
Operator C indicates one group:
  group 1: pattern length=1, blacklist.

Start Value+Range

Another option is that groups are defined in terms of a 'start PCI' and a 'range'. e.g. PCIs with (decimal) values 100-199 (inclusive) would be signalled as being part of a group with 'start PCI'=100, and range=99.

Pattern from Arbitrary Part of the PCI

In general, the exemplary embodiments of this invention do not restrict the pattern to be a contiguous set of bits starting at the most significant bits. The exemplary embodiments of this invention also encompass the possibility to indicate that the pattern starts at a specific bit number within the PCI.

For example, if patterns were restricted to consecutive bits, the group of PCI values 'xxx110xxx' could be indicated by the combination of the pattern='110', and that the pattern starts at the $4^{th}$ most significant bit.

Alternatively, patterns could apply to arbitrary bits. This could be indicated by means of a bitmap. Such as the group of PCI values 'xxx1x110x' could be indicated by a mask='000101110' (where 1 indicates that the pattern applies to that bit), and a pattern '000101100'; alternatively, this could be compressed as described in the options above, so that only the actual pattern bits (in this example, '1110') are signalled.

Even in the case of a mask plus pattern approach, which may take 18 bits to signal, this would still benefit from a) a reduction in signalling compared with having to signal many individual 9-bit PCI values, and b) the fact that, provided the grouping remains valid, no update to the group signalling is required.

Multiple Instances

In all of the above cases, the representation of a group can be repeated to refine or more accurately represent a set of cells; in approaches using a blacklist/whitelist sense, these repetitions need not have this aspect set the same in all cases.

Interpretation in the Absence of a List

Default behaviour is specified in the case that no group of cells are provided. In the inter-operator scenario described above, it is proposed that all cells are considered 'acceptable'.

As an example, the following structure which can be sent or received relates to a signaling comprising an indication of an individual cell and/or a grouping of cells based at least in part on their physical layer cell identification. According to the exemplary embodiments of the invention at least a pattern, pattern length, and pattern sense field can be included in the signaling for use in indicating or determining the individual cell and/or the grouping of the cells based at least in part on their physical layer cell identification.

---
PCID_Pattern_length
PCID_Pattern
PCID_pattern_sense
---

This structure identifies at least one cell by means of their physical layer cell identities. As a non-limiting aspect of the exemplary embodiments of the invention, in response to receiving this structure the mobile station may or may not perform measurements of these cells or attempt reselection to these cells. Further, the structure may indicate whether the cells are accessible or not accessible by a network node, such as a mobile station.

As a further example, this structure may be used to identify one or more E-UTRAN or other types of cells by means of their physical layer cell identities. Accordingly, the mobile station shall or shall not perform measurements or attempt reselection to these cells.

More particularly the structure above comprises:

PCID_Pattern_length (3 bit field)
PCID_Pattern
PCID_pattern_sense (1 bit field)

If the PCID_pattern_sense bit is equal to '0' then groups of cells are those where the most significant bits of the physical layer cell identity are equal to "PCID_pattern". If the PCID_pattern_sense bit is equal to '1' then the group of cells is all those where the most significant bits of the physical layer cell identity are not equal to the PCID_pattern.

Figure 3:
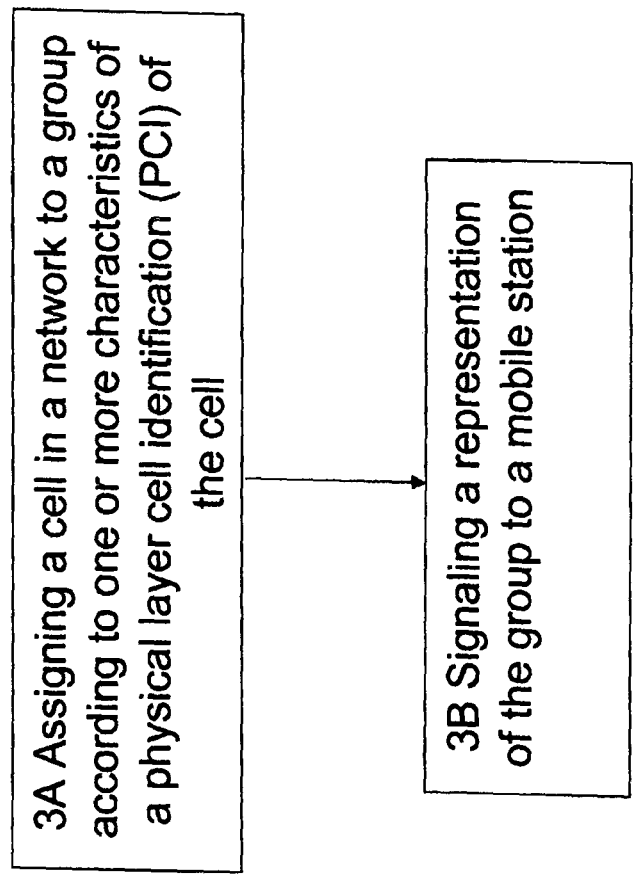
FIG. 3 is a logic flow diagram that illustrates the operation of a method, and a result of execution of computer program instructions, in accordance with the exemplary embodiments of this invention.

Based on the foregoing it should be apparent that the exemplary embodiments of this invention provide a method, apparatus and computer program product(s) for, as shown in FIG. 3, assigning a cell in a network to a group according to one or more characteristics of a physical layer cell identification (PCI) of the cell (Block 3A), and signaling a representation of the group to a mobile station (Block 3B).

It is noted that the various lengths of fields as described above are exemplary and are not construed to be limiting to the exemplary embodiments of the invention.

Figure 4:
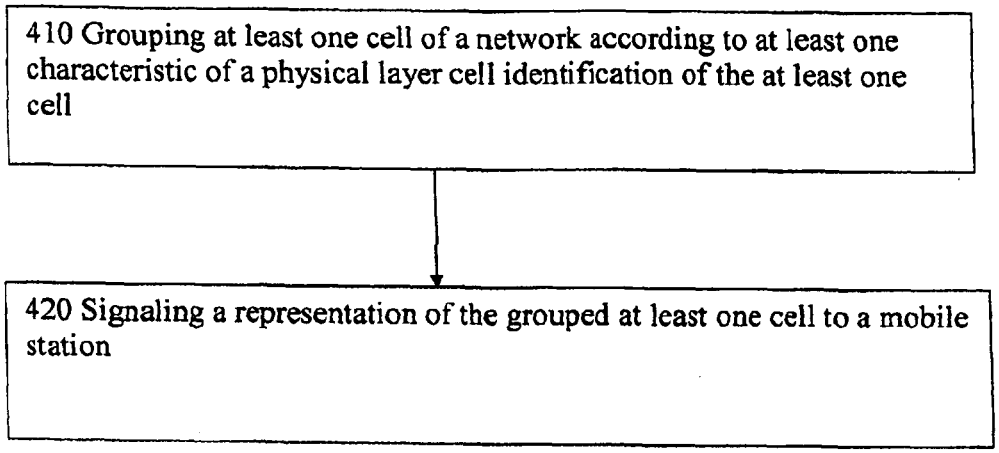
FIG. 4 is a logic flow diagram which illustrates the operation of a method, and a result of execution of computer program instructions, in accordance with the exemplary embodiments of this invention drawn to a signaling side of the operation.

In addition, based on the forgoing it should also be apparent that the exemplary embodiments of the invention provide a method, apparatus and computer program product(s), as shown in FIG. 4, for grouping at least one cell of a network according to at least one characteristic of a physical layer cell identification (PCI or PCID) of the at least one cell (Block 410), and signaling a representation of the grouped at least one cell to a mobile station (Block 420).

Figure 5:
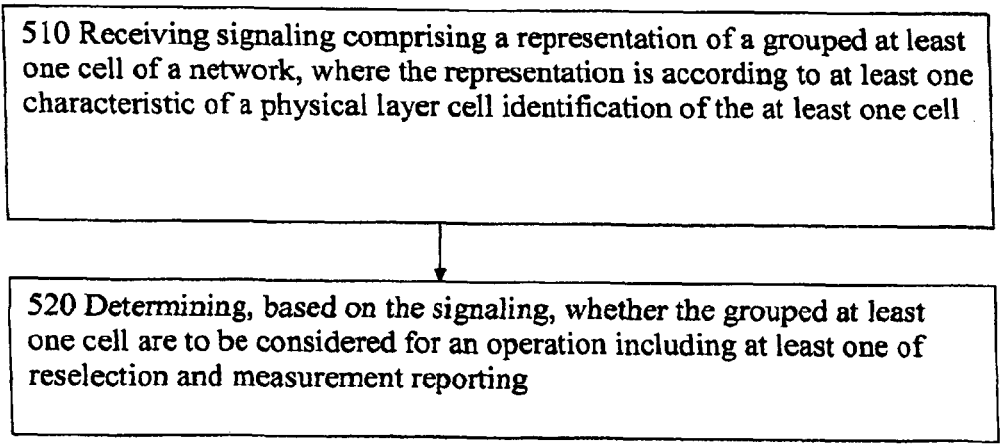
FIG. 5 is a logic flow diagram which illustrates the operation of a method, and a result of execution of computer program instructions, drawn to a side of the operation where the signaling is received.

Further, based on the forgoing it should also be apparent that the exemplary embodiments of the invention provide a method, apparatus and computer program product(s), as shown in FIG. 5, for receiving signaling comprising a representation of a grouped at least one cell of a network, where the representation is according to at least one characteristic of a physical layer cell identification of the at least one cell (Block 510), and determining, based on the signaling, whether the grouped at least one cell are to be considered for an operation including at least one of reselection and measurement reporting (Block 520).

In addition, it can be seen that in FIG. 6 there is illustrated a block diagram showing characteristics and examples of the signaling which can be seen to include a first field comprising a pattern length in bits (Block 630), a second field comprising a pattern of bits of a length defined based on said first field (Block 640), and a third field comprising a sense bit to indicate whether the group of at least one cell includes each cell identified by a physical layer cell identification of which the most significant bit or bits equal said pattern of bits, or each cell identified by a physical layer cell identification of which the most significant bit or bits do not equal said pattern of bits (Block 650).

The method, apparatus and computer program product(s) of the previous paragraphs, where the representation of the group is according to the characteristics of a fixed length set of bits in the PCI.

The method, apparatus and computer program product(s) of the previous paragraphs, where the representation of the group is according to the characteristics of a variable length set of bits in the PCI.

The method, apparatus and computer program product(s) of the previous paragraph, where the characteristic of the variable length set of bits is one or more repetitions of a pattern in the bits.

The method, apparatus and computer program product(s) of the previous paragraph, where the signaling comprises indicating with a bit whether or not the group is accessible in the network.

The method, apparatus and computer program product(s) of the previous paragraphs, where the signaling comprises indicating with a bit whether or not the group or pattern describes cells that are accessible by the mobile station or not.

The method, apparatus and computer program product(s) of the previous paragraphs, where the signaling comprises indicating with a bit whether or not the pattern or the group describes or indicates cells that are accessible to an operator in whose network the signaling is being sent or another operator.

The method, apparatus and computer program product(s) of the previous paragraphs, where the indicating bit is one of a blacklist bit indicating the group is not part of the network and a whitelist bit indicating the group is part of the network.

The method, apparatus and computer program product(s) of the previous paragraphs, where the signaling comprises one of a blacklist bit indicating the group is not accessible for cell reselection purposes and a whitelist bit indicating a group is accessible for reselection purposes.

The method, apparatus and computer program product(s) of the previous paragraphs, where the signaling comprises the bit added to a definition of a pattern or a group to indicate whether the pattern or the group describes or indicates cells that are accessible to an operator in whose network the signaling is being sent or another operator.

The method, apparatus and computer program product(s) of the previous paragraphs, where the signaling includes a start PCI value and a range.

The method, apparatus and computer program product(s) of the previous paragraphs, where the representation includes a pattern of bits and where the signaling indicates a start bit for the pattern.

The method, apparatus and computer program product(s) of the previous paragraph, where the representation includes a pattern of bits and where the pattern is applied to arbitrary bits in the representation.

Further in accordance with exemplary embodiments of this invention the UE 10 of FIG. 2 is constructed to contain circuitry configured to receive a signaling of a representation of a group, which may be in a long term evolution (LTE) network or another type of network, comprising an indication according to one or more characteristics of a physical layer cell identification (PCI) of a cell belonging to the group, and the circuitry contained in the UE 10 is further configured to, responsive to the signaling, reselect a cell in the network based upon the indication.

In the UE of the previous paragraph, where the signaling the representation of the group is according to characteristics of a fixed length set of bits in a PCI.

In the UE of the previous paragraphs, where the signaling the representation of the group is according to the characteristics of a variable length set of bits in the PCI.

In the UE of the previous paragraphs, where the indication is according to characteristics of a variable length set of bits is one or more repetitions of a pattern in the bits.

In the UE of the previous paragraphs, where the received signaling comprises an indication with a bit whether the group is part of the network the UE belongs to.

The UE in the previous paragraph, where the received signaling comprises an indication with a bit whether the group or pattern describes cells that are accessible by the UE or not.

The UE in the previous paragraph, where the received signaling comprises an indication with a bit whether or not the pattern or the group describes or indicates cells that are accessible to an operator in whose network a signaling is being sent or another operator.

In the UE of the previous paragraph, where the indicating bit is one of a blacklist bit indicating the group is not part of the network and a whitelist bit indicating the group is part of the network.

The UE in the previous paragraph, where the indicating bit is one of a blacklist bit indicating the group is not accessible for cell reselection purposes and a whitelist bit indicating the group is accessible for reselection purposes.

The various blocks shown in at least FIGS. 3, 4, 5, and 6 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the exemplary embodiments of the invention are not limited thereto.

While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the EUTRAN (UTRAN-LTE) system, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   grouping at least one cell of a network according to at least one characteristic of a physical layer cell identification of the at least one cell, and
   signaling a representation comprising the at least one characteristic of the grouped at least one cell to a mobile station, where the signaling comprises:
   a first field comprising bits indicating a pattern length in bits of most significant bits of a physical layer cell identification;
   a second field comprising a pattern of bits of a length defined based on said first field; and
   a third field comprising a sense bit to indicate whether the group of at least one cell includes each cell identified by a physical layer cell identification of which the most significant bit or bits equal said pattern of bits, or each cell identified by a physical layer cell identification of which the most significant bit or bits do not equal said pattern of bits.

2. The method as in claim 1, where the first field comprising the bits indicating the length of the pattern is a three bit field and the third field comprising the sense bit is a one bit field.

3. The method as in claim 1, where if the sense bit is equal to 0 then each cell of the grouped at least one cell is identified by the most significant bit or bits of the physical layer cell identification being equal to the pattern of bits, and if the sense bit is equal to 1 then each cell of the grouped at least one cell is identified by the most significant bit or bits of the physical layer cell identification being not equal to the pattern of bits.

4. The method as in claim 1, where the network is a long term evolution network.

5. The method as in claim 1, performed by a network node in the network.

6. A memory embodying a computer program executable by a processor to perform the method as in claim 1.

7. An apparatus, comprising:
at least one processor; and
at least one memory including computer program code, where the at least one memory and the computer program code are configured, with the at least one processor, to cause the apparatus to at least:
group at least one cell of a network according to at least one characteristic of a physical layer cell identification of the at least one cell, and
signal a representation comprising the at least one characteristic of the grouped at least one cell to the mobile station, where the signaling comprises:
a first field comprising bits indicating a pattern length in bits of most significant bits of a physical layer cell identification;
a second field comprising a pattern of bits of a length defined based on said first field and
a third field comprising a sense bit to indicate whether the grouped at least one cell includes each cell identified by a physical layer cell identification of which the most significant bit or bits equal said pattern of bits, or each cell identified by a physical layer cell identification of which the most significant bit or bits do not equal said pattern of bits.

8. The apparatus as in claim 7, where the first field comprising the bits indicating the length of the pattern is a three bit field and the third field comprising the sense bit is a one bit field.

9. The apparatus as in claim 7, where if the sense bit is equal to 0 then each cell of the grouped at least one cell is identified by the most significant bit or bits of the physical layer cell identification being equal to the pattern of bits, and if the sense bit is equal to 1 then each cell of the grouped at least one cell is identified by the most significant bit or bits of the physical layer cell identification being not equal to the pattern of bits.

10. The apparatus as in claim 7, embodied in a network node of the network.

11. An apparatus comprising:
means for grouping at least one cell of a network according to at least one characteristic of a physical layer cell identification of the at least one cell, and
means for signaling a representation comprising the at least one characteristic of the grouped at least one cell to a mobile station, where the signaling comprises:
a first field comprising bits indicating a pattern length in bits of most significant bits of a physical layer cell identification;
a second field comprising a pattern of bits of a length defined based on said first field; and
a third field comprising a sense bit to indicate whether the grouped at least one cell includes each cell identified by a physical layer cell identification of which the most significant bit or bits equal said pattern of bits, or each cell identified by a physical layer cell identification of which the most significant bit or bits do not equal said pattern of bits.

12. The apparatus of claim 11, where the means for identifying and signaling comprises a processor and an interface.

13. A method comprising:
receiving, at a mobile station, signaling comprising a representation of a grouped at least one cell of a network, where the representation is according to at least one characteristic of a physical layer cell identification of the at least one cell; and
determining, based on the signaling, whether the grouped at least one cell are to be considered for an operation including at least one of reselection and measurement reporting, where the signaling comprises:
a first field comprising bits indicating a pattern length in bits of most significant bits of a physical layer cell identification;
a second field comprising a pattern of bits of a length defined based on said first field; and
a third field comprising a sense bit to indicate whether the grouped at least one cell includes each cell identified by a physical layer cell identification of which the most significant bit or bits equal said pattern of bits, or each cell identified by a physical layer cell identification of which the most significant bit or bits do not equal said pattern of bits.

14. The method as in claim 13, where if the sense bit is equal to 0 then each cell of the grouped at least one cell is identified by the most significant bit or bits of the physical layer cell identification being equal to the pattern of bits, and if the sense bit is equal to 1 then each cell of the grouped at least one cell is identified by the most significant bit or bits of the physical layer cell identification being not equal to the pattern of bits.

15. A memory embodying a computer program executable by a processor to perform the method as in claim 13.

16. An apparatus comprising:
at least one processor; and
at least one memory including computer program code, where the at least one memory and the computer program code are configured, with the at least one processor, to cause the apparatus to at least:
receive signaling comprising a representation of a grouped at least one cell of a network, where the representation is according to at least one characteristic of a physical layer cell identification of the at least one cell; and
determine, based on the signaling, whether the grouped at least one cell are to be considered for an operation including at least one of reselection and measurement reporting, where the signaling comprises:
a first field comprising bits indicating a pattern length in bits of most significant bits of a physical layer cell identification;
a second field comprising a pattern of bits of a length defined based on said first field; and
a third field comprising a sense bit to indicate whether the grouped at least one cell includes each cell identified by a physical layer cell identification of which the most significant bit or bits equal said pattern of bits, or each cell identified by a physical layer cell identification of which the most significant bit or bits do not equal said pattern of bits.

17. The apparatus as in claim 16, where if the sense bit is equal to 0 then each cell of the grouped at least one cell is identified by the most significant bit or bits of the physical layer cell identification being equal to the pattern of bits, and if the sense bit is equal to 1 then each cell of the grouped at least one cell is identified by the most significant bit or bits of the physical layer cell identification being not equal to the pattern of bits.

18. The apparatus as in claim 16, embodied in a network node of the network.

19. An apparatus comprising:
means for receiving signaling comprising a representation of a grouped at least one cell of a network, where the representation is according to at least one characteristic of a physical layer cell identification of the at least one cell; and
means for determining, based on the signaling, whether the grouped at least one cell are to be considered for an operation including at least one of reselection and measurement reporting, where the signaling comprises:
   a first field comprising bits indicating a pattern length in bits of most significant bits of a physical layer cell identification;
   a second field comprising a pattern of bits of a length defined based on said first field; and
   a third field comprising a sense bit to indicate whether the grouped at least one cell includes each cell identified by a physical layer cell identification of which the most significant bit or bits equal said pattern of bits, or each cell identified by a physical layer cell identification of which the most significant bit or bits do not equal said pattern of bits.

20. The apparatus as in claim 19 where the means for receiving comprises an interface, and the means for determining comprises a processor.

* * * * *